US008769439B2

(12) United States Patent
Nauerz et al.

(10) Patent No.: US 8,769,439 B2
(45) Date of Patent: Jul. 1, 2014

(54) METHOD FOR CREATION, MANAGEMENT, AND PRESENTATION OF USER-SCOPED NAVIGATION TOPOLOGIES FOR WEB APPLICATIONS

(75) Inventors: Andreas Nauerz, Boeblingen (DE); Stefan Liesche, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1568 days.

(21) Appl. No.: 11/745,576

(22) Filed: May 8, 2007

(65) Prior Publication Data
US 2008/0066002 A1 Mar. 13, 2008

(30) Foreign Application Priority Data
Sep. 11, 2006 (EP) .................................... 06120467

(51) Int. Cl.
*G06F 3/048* (2013.01)
*G06F 3/0481* (2013.01)
*G06F 3/0486* (2013.01)

(52) U.S. Cl.
CPC ............ *G06F 3/0481* (2013.01); *G06F 3/0486* (2013.01)
USPC ........... 715/854; 715/853; 715/760; 715/769; 715/744

(58) Field of Classification Search
CPC ............................. G06F 3/0481; G06F 3/0486
USPC .................................. 715/853, 854, 760, 769
See application file for complete search history.

(56) References Cited

U.S. PATENT DOCUMENTS

| | | | | |
|---|---|---|---|---|
| 2003/0065706 A1* | 4/2003 | Smyth et al. | ................. | 709/200 |
| 2003/0120662 A1* | 6/2003 | Vishik | ........................... | 707/100 |
| 2003/0225778 A1* | 12/2003 | Fisher et al. | ................. | 707/102 |
| 2004/0133660 A1* | 7/2004 | Junghuber et al. | ........... | 709/219 |
| 2004/0167871 A1* | 8/2004 | Owen et al. | ....................... | 707/1 |
| 2004/0230947 A1* | 11/2004 | Bales et al. | .................. | 717/110 |
| 2005/0097190 A1* | 5/2005 | Abdelhak | ...................... | 709/217 |
| 2005/0120288 A1* | 6/2005 | Boehme et al. | ............... | 715/500 |
| 2005/0159921 A1* | 7/2005 | Louviere et al. | ............. | 702/181 |
| 2005/0240857 A1* | 10/2005 | Benedict et al. | ............. | 715/500 |
| 2005/0267869 A1* | 12/2005 | Horvitz et al. | .................. | 707/2 |
| 2006/0053090 A1* | 3/2006 | Cotter et al. | ..................... | 707/3 |
| 2006/0294496 A1* | 12/2006 | Smith et al. | .................. | 717/105 |
| 2007/0265929 A1* | 11/2007 | Danninger | ..................... | 705/26 |
| 2007/0265930 A1* | 11/2007 | Mohr | ............................. | 705/26 |

* cited by examiner

*Primary Examiner* — Tuyetlien Tran
(74) *Attorney, Agent, or Firm* — Jeff Tang; Hoffman Warnick LLC

(57) ABSTRACT

The present invention is directed to a method and system for designing a web portal or enterprise portal comprising a hierarchical structure of portal pages and portlets for accessing web content or enterprise content accessible via the portal. A method for modifying a given hierarchical navigation topology including nodes and edges connected between the nodes in a web application environment, in which topology a web page corresponds to a predetermined topology level and displays one or more applets, includes: providing a user interface for defining a user-specific topology, the defining including promoting a node within the topology to a higher level; demoting a node within the topology to a lower level; and moving a node within a page level; storing information for recovering a user-modified topology in a database; and displaying the user-modified topology to the user in response to the user specifying a predetermined node.

9 Claims, 5 Drawing Sheets

PRIOR ART
PORTAL SERVER   FIG. 1

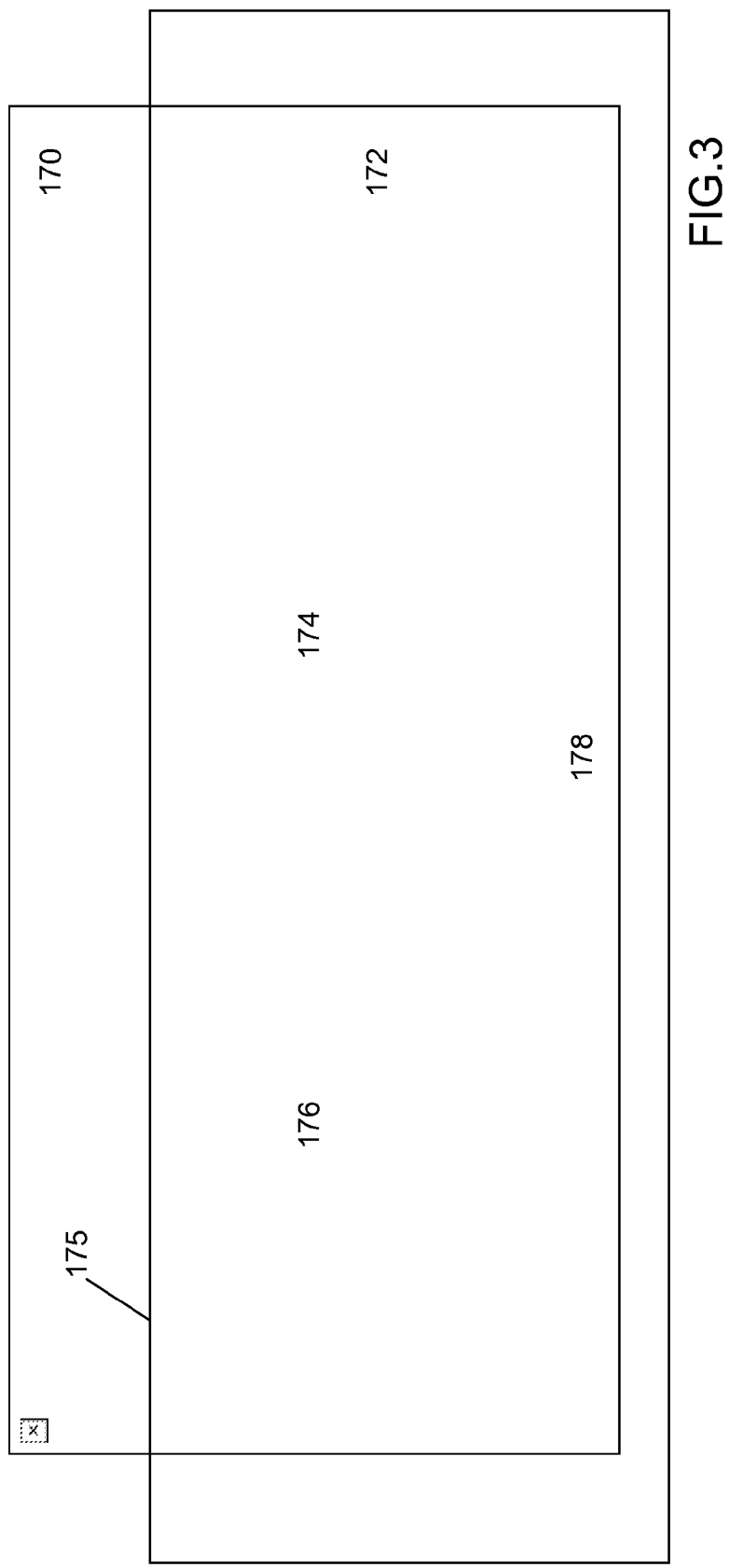

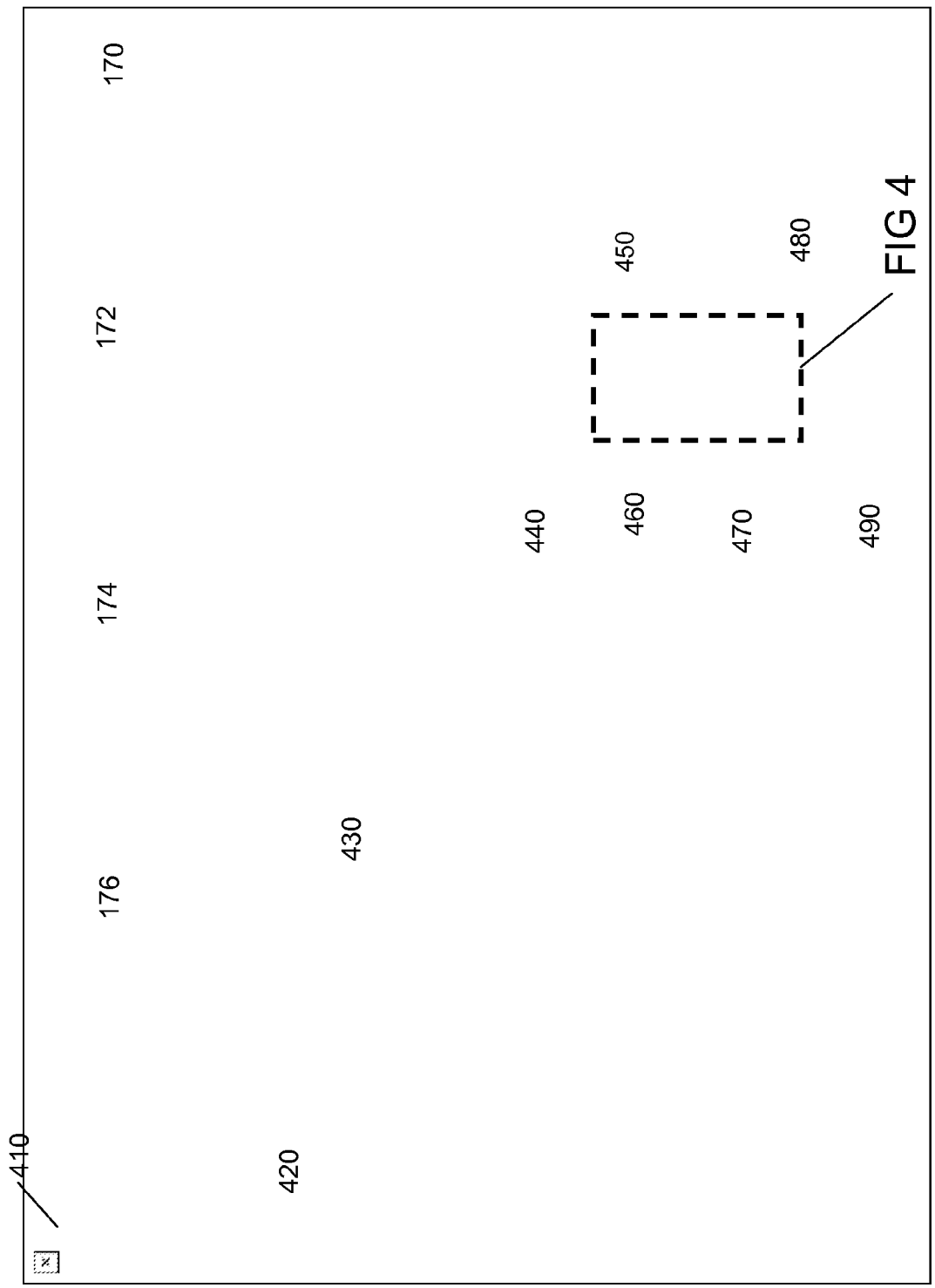

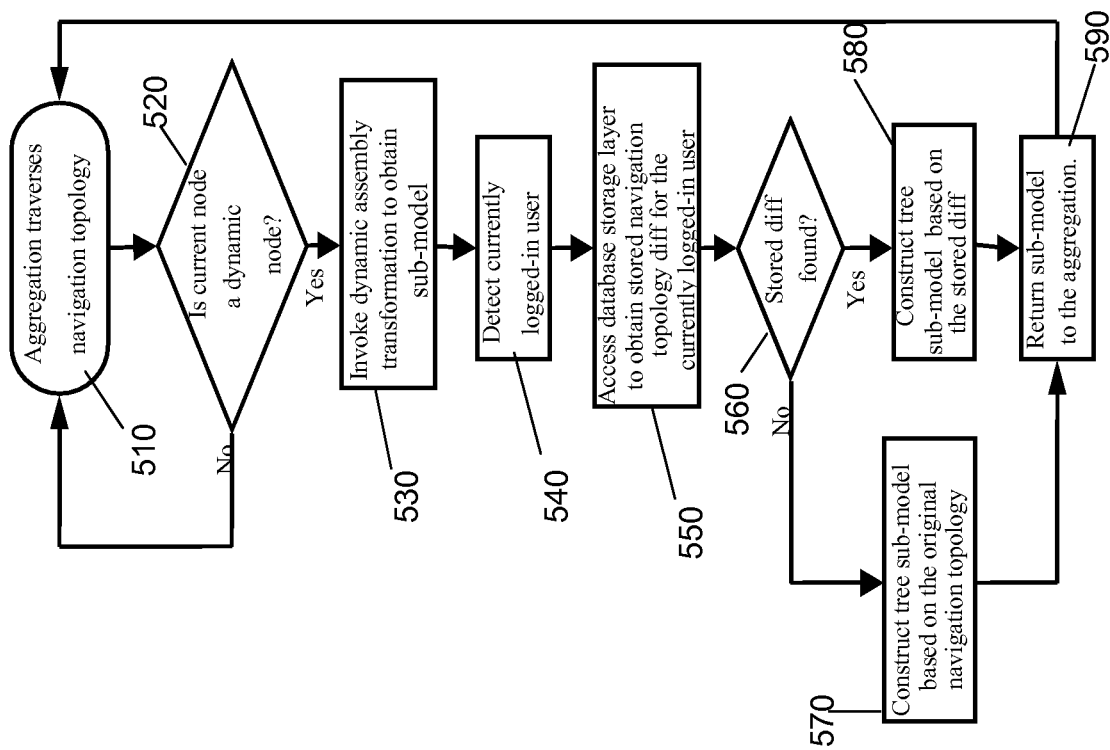

METHOD FOR CREATION, MANAGEMENT, AND PRESENTATION OF USER-SCOPED NAVIGATION TOPOLOGIES FOR WEB APPLICATIONS

BACKGROUND OF THE INVENTION

1. Field of the Invention

The present invention relates to the field of network computing, and in particular to a method and system for designing a web portal or enterprise portal comprising a hierarchical structure of portal pages and portlets for accessing web content or enterprise content accessible via the portal.

2. Related Art

FIG. 1 illustrates a schematic system view of an implementation of a web portal on a portal server in accordance with the prior art.

A prior art portal as, e.g., represented by an IBM WebSphere Portal, is provided by complex functionality implemented on a network server, such as the web server 100 illustrated in FIG. 1. The web server 100 includes logic components for user authentication 105, state handling 110, and aggregation 170 of fragments, as well as a plurality of portlets 120 provided in respective pages 125 with a respective plurality of application programming interfaces (APIs) 130, portlet container software 135, and portal storage resources 140. The logic components are operatively connected such that data can be exchanged between single components as required.

A portal engine of the web server 100 in FIG. 1 implements an aggregation of portlets 120 based on the underlying portal model 150 and portal information such as security settings, user roles, customization settings, and device capabilities. Within the rendered page, the portal automatically generates the appropriate set of navigation elements based on the portal model 150. The portal engine invokes portlets 120 during the aggregation as required and when required and uses caching to reduce the number of requests made to portlets. The prior art IBM WebSphere Portal employs open standards such as the Java Portlet API (Java is a registered trademark of Sun Microsystems, Inc. in the United States and other countries). It also supports the use of a remote portlet via the Web Services for Remote Portlets (WSRP) standard.

The portlet container 135 is a single control component for all portlets 120, which may control the execution of code residing in each of these portlets 120. It provides the runtime environment for the portlets 120 and facilities for event handling, inter-portlet messaging, and access to portlet instance and configuration data, among others. The portal resources 140 are in particular the portlets 120 themselves and the pages 125, on which they are aggregated in the form of an aggregation of fragments. A portal database 128 stores the portlet description, which includes, for example, attributes such as portlet name, portlet description, portlet title, portlet short title, and keywords, and the portlet interaction interface description, which is often stored in form of WSDL documents. The portal database 128 also stores the portal content structure, i.e., the hierarchical structure of portal pages, which may contain nested pages, and portlets. This data is stored in the portal database 128 in an adequate representation based on prior art techniques, such as relational tables.

The aggregation logic 170 provides all processes that are required to assemble a page 125. Typically, these processes include loading a content structure from storage, traversing the content structure, and calling the instances referenced in the content structure in order to obtain their output, which is assembled to a single page 125.

The content structure may be defined through, for example, portlet customization by an administrator.

When web applications are visited by a web user, a user is usually displayed a navigation menu that provides some means to access underlying content. A navigation menu is usually structured in a tree-like topology, and users are forced to traverse the tree in order to reach a node matching the content the user is interested in. Specifically, web portals are equipped with navigation menus which must be used to navigate through all of the contents the web portal provides.

Not every user is interested in the same content, and hence the structure which is provided for a given portal may satisfy the needs of a certain user group, but for many individual users the given topology does not satisfy their needs. Prior art techniques allow certain nodes of the topology to be blended out, i.e. blend-out a page or parts of a page (e.g., portlets). This, however is a very inflexible way to transverse the navigation tree.

SUMMARY OF THE INVENTION

The present invention provides a method and system offering improved web application navigation.

A mechanism is provided for moving nodes within the topology. More specifically, nodes are allowed to be moved up, i.e., promoted, and down, i.e., demoted, and left/right on the same level of a given topology. A user interface is provided, which allows a user to highlight certain nodes and to append the above mentioned move-functions to a highlighted node. A function-specific user interface is also provided, which allows a user to define the target level, which represents the target of the moving procedure. In this way, a user is able to build his/her own web application.

In accordance with an embodiment of the present invention, a sub node which directly depends on a moved node is also moved together with the highlighted node, for example, when a sub node has a significant semantic relation to the highlighted node. According to the invention, a storage module stores the difference between a new topology and a pre-existing original one, when the user has completed one or more topology modifications. A transformation component provided according to the present invention displays the user-modified topology within the web application, whenever the same user who modified the topology reenters or logs-in again into the web application. The transformation can be implemented by a so-called "dynamic node", which is understood to be a node which, when clicked by (or otherwise actuated) the user invokes an underlying function, which retrieves the user-modified topology. The root node can be the dynamic node. One use of the present invention is for web portals.

An implementation of the present invention provides a dynamic assembly of a user-specific topology by implementing tree models, transformations and dynamic nodes.

Tree models are calculations of a user-modeled, user-specific navigation topology. The term "tree" is used more generally than in the narrow mathematical sense, because in the present invention, it may also include a basically tree-like topology structure which also has some meshes. When a user defines his/her own topology structure, a root node can either be the root node of the original tree model or may be the root node of a sub tree, which would than be identical to a lower level node of the original topology.

Transformations are best implemented as application logic programmed in any suited programming language, e.g., as Java programs that contain logic for generating a tree model. The content of a generated model can be based on existing models but will include some user-specific modifications, for example, added, deleted or moved nodes.

The before-mentioned transformations are associated with a given node which is part of the original navigation topology. A "dynamic node" is a node, to which the transformation is assigned. A dynamic node always represents the root node of the tree model passed to the associated transformation.

The specific transformation can be implemented in a way that its model is comprised of virtual navigational nodes only. In contrast to real nodes, which also hold the information regarding the layout of the underlying content (e.g., which portlet is to display where, etc.), virtual nodes only reference the real nodes of the real topology, and do not contain this information but use it from the real nodes they reference. This advantageously reduces the amount of data that needs to be saved and can hence be seen as a major performance improvement. Allowing virtual nodes that have their own layout and do not reference any real nodes can be used, for example, where higher flexibility is required and users want to assemble pages not existing in the real topology.

The phrase "user-scoped navigation topologies," in accordance with the present invention, addresses topologies, which are adapted to a specific user.

An aspect of the present invention is directed to a method for modifying a given hierarchical navigation topology comprising nodes and edges connected between the nodes in a web application environment, in which topology a web page corresponds to a predetermined topology level and displays one or more applets, the method comprising: providing a user interface for defining a user-specific topology, the defining comprising: promoting a node within the topology to a higher level; demoting a node within the topology to a lower level; and moving a node within a page level; storing information for recovering a user-modified topology in a database; and displaying the user-modified topology to the user in response to the user specifying a predetermined node.

Another aspect of the present invention is directed to program product stored on a computer readable medium, which when executed, modifies a given hierarchical navigation topology comprising nodes and edges connected between the nodes in a web application environment, in which topology a web page corresponds to a predetermined topology level and displays one or more applets, the computer readable medium comprising program code for: providing a user interface for defining a user-specific topology, the defining comprising: promoting a node within the topology to a higher level; demoting a node within the topology to a lower level; and moving a node within a page level; storing information for recovering a user-modified topology in a database; and displaying the user-modified topology to the user in response to the user specifying a predetermined node.

Another aspect of the present invention is directed to a system for modifying a given hierarchical navigation topology comprising nodes and edges connected between the nodes in a web application environment, in which topology a web page corresponds to a predetermined topology level and displays one or more applets, comprising: a user interface for defining a user-specific topology, the defining comprising: promoting a node within the topology to a higher level; demoting a node within the topology to a lower level; and moving a node within a page level; a system for storing information for recovering a user-modified topology in a database; and a system for displaying the user-modified topology to the user in response to the user specifying a predetermined node.

BRIEF DESCRIPTION OF THE DRAWINGS

These and other features of this invention will be more readily understood from the following detailed description of the various aspects of the invention taken in conjunction with the accompanying drawings.

FIG. 3 is a schematic block diagram illustrating a portion of the portal server of FIG. 2.

FIG. 4 is a schematic block diagram illustrating a sequence of actions performed by a user (actor) using the components depicted in FIG. 3.

FIG. 5 is a schematic control flow diagram illustrating the operation of the dynamic assembly transformation component to assemble a user-specific portal topology.

DETAILED DESCRIPTION OF THE INVENTION

With general reference to the figures and with special reference now to FIG. 2, an embodiment of the present invention will be described in more detail below.

Figure 2:
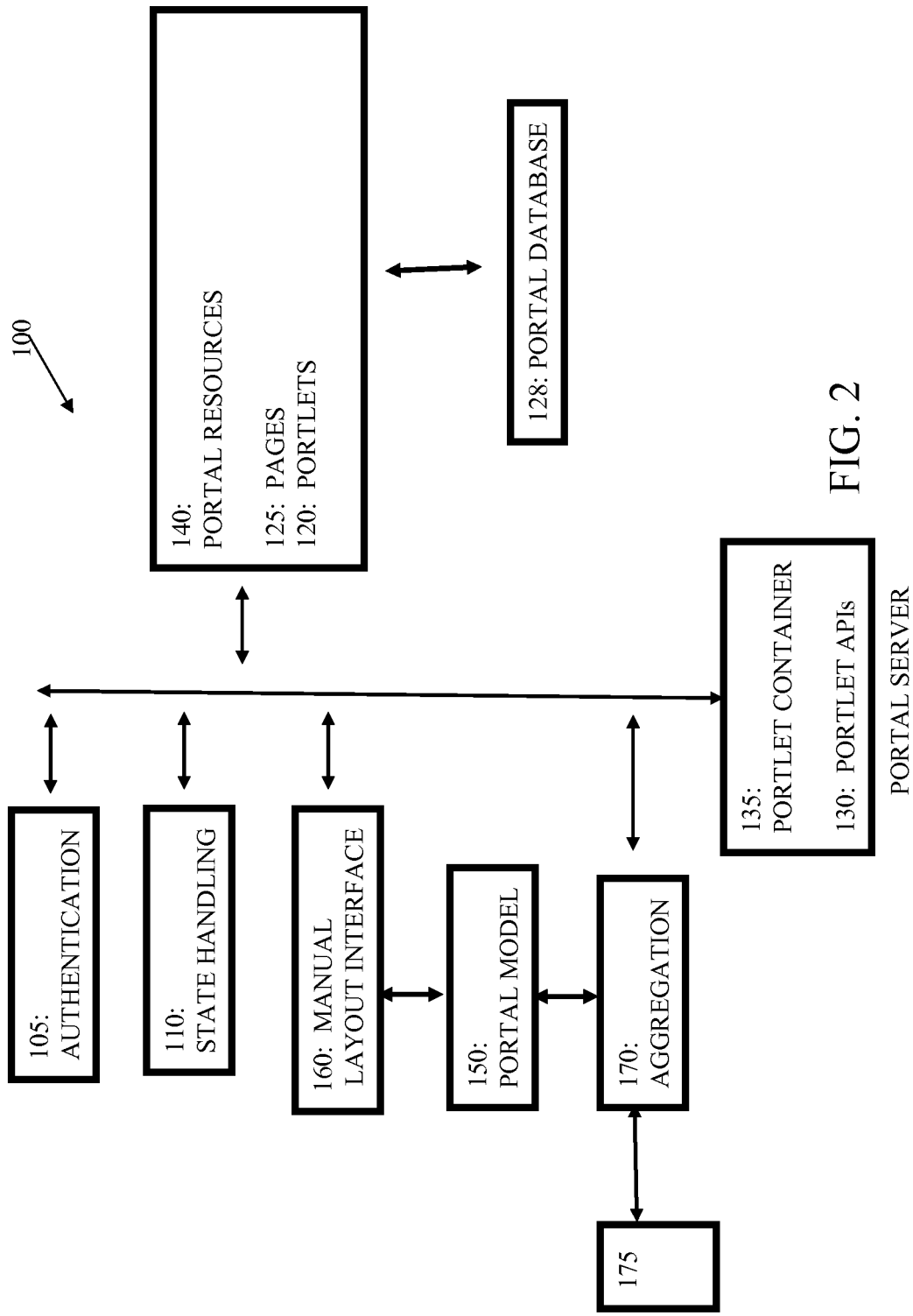
FIG. 2 is a schematic block diagram representation of a portal server according to an embodiment of the invention.

FIG. 2 shows an additional component 175, built-in into a prior art portal server 100, and cooperating closely with the aggregation component 170 via a respective programming interface.

With reference to FIG. 3, which provides an enlarged view of the component 175, a topology management component 176 is provided, which allows a user to construct his/her own navigation topology. In an implementation of the present invention, the topology management component 176 is a portlet which renders the entire navigation topology, or at least those parts to which a specific user has access to after having been logged-in successfully. In more detail, component 176 is a user interface offering basic functions for selecting and deselecting nodes. In accordance with an embodiment of the present invention, deselecting a node means not do display it, for example to hide it as a part of a user-specific navigation topology.

Further, component 176 offers basic tree operations in order to operate on nodes within a tree such that nodes can be moved a level up or a level down in the given navigation topology, or can be moved to the left or to the right within the same level. An implementation of this user interface generates an arrangement of icons which are ordered in a hierarchical way, for example, similar to the arrangement a user is usually confronted with when viewing a file system structure. Each icon can than be highlighted and moved by clicking on a control, associated, and placed (e.g., immediately behind the name of the node item). When a node item is highlighted and one of the associated move controls is clicked on, then the function behind this control will be executed.

Figure 1:
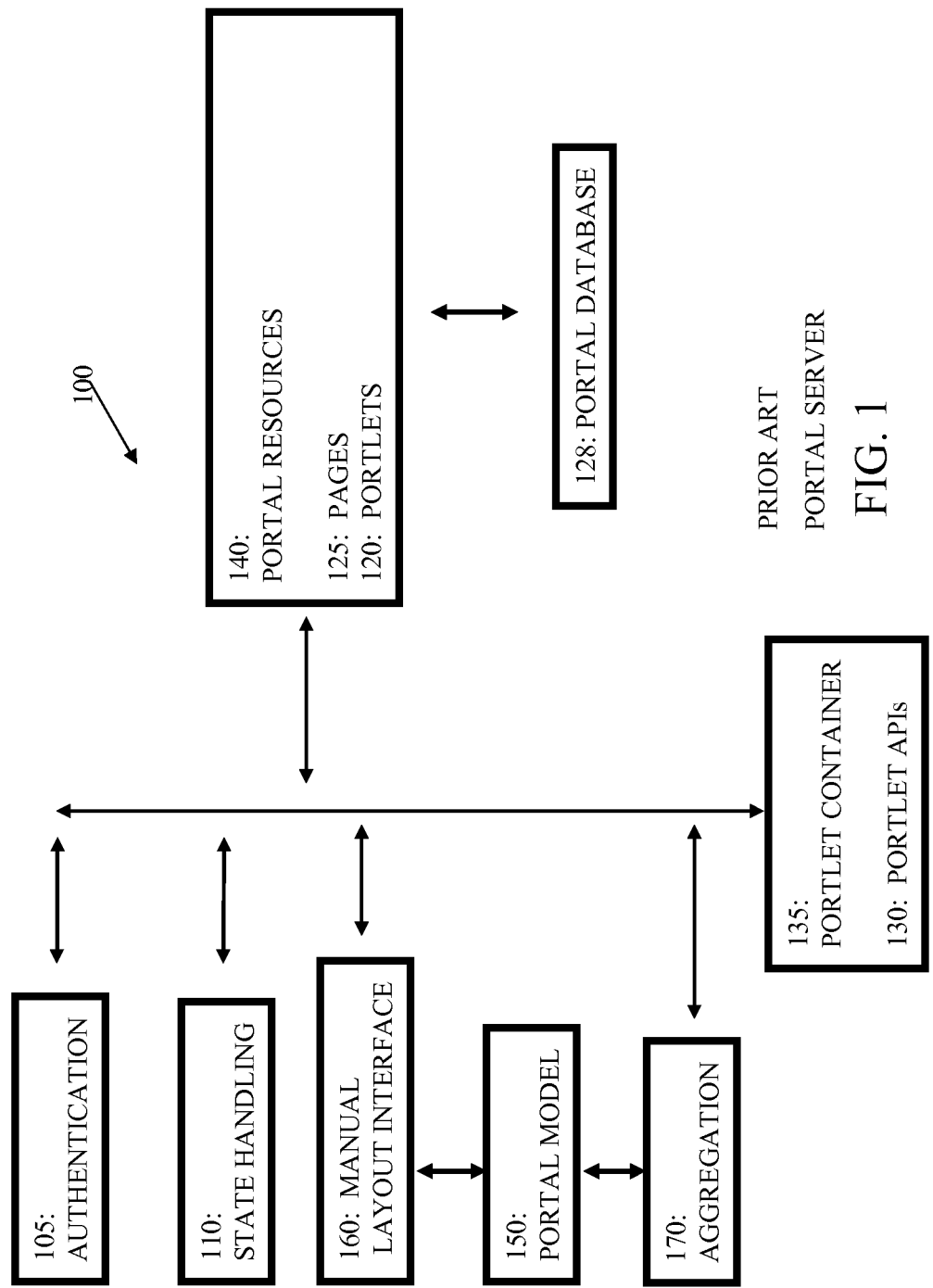
FIG. 1 is a schematic block diagram illustrating the structural components of a prior art portal server.

A database storage component 174 is provided according to this implementation for each user. The database storage component 174 stores the difference between a user-specific topology and the original topology, which is also basically stored on the web server physically. For this task an additional database table of a prior art portal database is provided. This table is denoted as 178, where the database is denoted as 128 in FIG. 1 and 2. Each time a user has successfully logged-in, the user-specific data stored in this specific database table 178 is read and evaluated by a dynamic assembly transformation component 172 in order to reconstruct the user-specific navigation topology.

The dynamic assembly transformation component 172 performs this reconstruction and replaces the original navigation topology by the user-specific topology.

A transformation is implemented as a function associated with the root node of the original navigation topology, which root node thereby becomes a dynamic node in the above sense. Every time the aggregation component 170 traverses the original navigation topology, it immediately stops at the root node and asks the transformation for the sub-model reflecting the user-specific topology to be built-in under the dynamic node. This build-in process is implemented just by linking an original node to the user-specific node of the user-specific topology. The transformation component 172 then reads the user-specific navigation topology for the currently logged-in user from the respective database entry of this user and constructs the user-specific sub-model of the navigation tree (navigation topology), which is then phased-in under the root node, representing the entire custom navigation topology for this user. In an implementation of the present invention, each node of the user-specific navigation topology is actually a reference to a real node in the original navigation topology such that changes regarding the content of a node in the real navigation topology are automatically reflected in this "virtual" user-specific structure without the requirement to amend a user-specific topology on each content modification within the original topology. To this extent, this virtual structure looks exactly like the original navigation structure, except that the user-specific structure is arranged differently. The look-and-feel behavior present in the user-specific portal, however, is always maintained.

With reference to FIG. 4, the interaction between components 170, 172, 174 and 176 will be described in more detail in the case when a user 410 first designs his own topology and then after a second log-in.

The user starts by manipulating the original navigation topology in 420 using the topology management component 176, as described above. When the method is used a second time, the original topology can also be a topology, which has already been modified by the user. Component 176 then triggers the storage of the changes to the original navigation topology by invoking the database storage component 174. The actual storage procedure is performed by the storage component 174 in 430.

Next time, when the same user logs in again, the aggregation component 170 starts to render the navigation topology as done in the prior art in 440. At the root node of the custom topology tree, a dynamic transformation is detected by aggregation component 170 which stops the usual rendering process. Instead of the usual rendering process, the aggregation component 170 invokes the dynamic assembly transformation component 172, and requests in 450 the user-specific tree model (sub-model) to be phased-in under this dynamic node the user had navigated on. If the root node triggers this transformation, the complete original topology will be replaced by the user-specific topology. Component 172 reads the topology difference stored for this specific user from the database 178 in 460, and constructs the user model by means of this information and the original information. The calculated topology is then again returned to the component 172 in 470. Component 172 then returns the calculated sub-model to the aggregation component 170 in 480. Aggregation component 170 finally renders the user-specific navigation topology and displays it to the user in 490.

FIG. 5 is a schematic control flow diagram illustrating the operation of the dynamic assembly transformation component to assemble a user-specific portal topology in accordance with an embodiment of the present invention. In 510, the aggregation component 170 traverses the navigation topology. If it is determined in 520 that the current node is a dynamic node (Yes, 520), flow passes to 530, where a dynamic assembly transformation to obtain a sub-model is invoked. If not (No, 520) flow passes back to 510.

After the invocation of the dynamic assembly transformation in 530, the log-in of a currently logged-in user is detected in 540. Thereafter, the database storage layer is accessed in 550 to obtain any stored navigation topology differences for the currently logged-in user. If a stored navigation topology differences is found in 560 for the currently logged-in user (Yes, 560), a tree sub-model based on the stored navigation topology differences is constructed in 580 and returned to the aggregation component 170 in 590. Flow then passes back to 510. If a stored navigation topology differences is not found in 560 for the currently logged-in user (No, 560), then a tree sub-model based on the original navigation topology is constructed in 570 and returned to the aggregation component 170 in 590. Flow then passes back to 510.

In another embodiment of the present invention, a user may also generate a further topology which represents the user's own, specific context, or use case. Such context or use case can, for example, be the fact that a user uses a PDA device instead of a notebook or desktop computer. In this case, the screen will be much smaller and the topology can be modified in order to display basically all those portlets on a high level in the topology which are commonly used when the person is traveling, which can be expected when the PDA is used. As such, a portlet for route calculation or a portlet for currency exchange rates can, for example, be displayed at the top of the page. Other examples of such rules include time-related rules, for example if it is Monday and before 10 am then the calendar portlet is moved to a predetermined navigation position.

The skilled reader will appreciate that the above-described embodiments showing certain procedures and proposed sequences are primarily given for demonstrating the general concepts of the present invention by way of example. Thus, it will be understood that those examples may be varied in various aspects, such as, for example, the ordering of steps, the degree of parallelization between steps, the implementation details of the single steps, the form in which data is stored, the way how the grouping of portlets is achieved, etc., and respective further embodiments can be obtained.

The present invention can be realized in hardware, software, or a combination of hardware and software. A portlet arrangement tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system and executed—is able to carry out these methods.

Computer program means or computer program in the present context mean any expression, in any language, code or notation, of a set of instructions intended to cause a system having an information processing capability to perform a particular function either directly or after either or both of the following: a) conversion to another language, code or notation; and b) reproduction in a different material form.

The invention claimed is:

1. A method for modifying a hierarchical navigation topology comprising nodes and edges connected between the nodes in a web application environment, in which the hierarchical navigation topology of a web page corresponds to a predetermined topology level and displays one or more applets, the method comprising:
defining a user-specific topology based on the navigation topology entered by the user;
storing information for recovering the user-specific topology in a database, wherein the information for recovering the user-specific topology comprises difference information between the navigation topology and the user-specific topology;
receiving a user login from the user subsequent to the defining of the user-specific topology and the storing of the difference information between the navigation topology and the user-specific topology;
initiating rendering of the navigation topology in response to the user login;
stopping the rendering of the navigation topology upon detection of a dynamic node therein;
performing a dynamic assembly transformation upon detection of the dynamic node to obtain the user-specific topology, the dynamic assembly transformation comprising:
detecting an identity of the user;
based on the identity of the user, reading the difference information between the navigation topology and the user-specific topology from the database;
generating the user-specific topology by combining the navigation topology and the difference information; and
generating a user specific context topology for the user from the user-specific topology, the user specific context topology representing a modified topology of the user-specific topology that is configured specifically for display on a type of computer system used by the user to perform the computer login; and
displaying one of the user-specific topology and the user specific context topology to the user in response to completing the dynamic assembly transformation.

2. The method according to claim 1, wherein the web application comprises a web portal application, and the applets comprise portlets.

3. The method according to claim 1, further comprising: a user interface including an administration applet displayed on a highest level application page.

4. A program product stored on a non-transitory computer readable storage medium, which when executed, modifies a hierarchical navigation topology comprising nodes and edges connected between the nodes in a web application environment, in which the hierarchical navigation topology of a web page corresponds to a predetermined topology level and displays one or more applets, the computer readable storage medium comprising program code for:
defining a user-specific topology based on the navigation topology entered by the user;
storing information for recovering the user-specific topology in a database, wherein the information for recovering the user-specific topology comprises difference information between the navigation topology and the user-specific topology;
receiving a user login from the user subsequent to the defining of the user-specific topology and the storing of the difference information between the navigation topology and the user-specific topology;
initiating rendering of the navigation topology in response to the user login;
stopping the rendering of the navigation topology upon detection of a dynamic node therein;
performing a dynamic assembly transformation upon detection of the dynamic node to obtain the user-specific topology, the dynamic assembly transformation comprising:
detecting an identity of the user;
based on the identity of the user, reading the difference information between the navigation topology and the user-specific topology from the database;
generating the user-specific topology by combining the navigation topology and the difference information; and
generating a user specific context topology for the user from the user-specific topology, the user specific context topology representing a modified topology of the user-specific topology that is configured specifically for display on a type of computer system used by the user to perform the computer login; and
displaying one of the user-specific topology and the user specific context topology to the user in response to completing the dynamic assembly transformation.

5. The program product according to claim 4, wherein the web application comprises a web portal application, and the applets comprise portlets.

6. The program product according to claim 4 further comprising: a user interface including an administration applet displayed on a highest level application page.

7. A system for modifying a hierarchical navigation topology comprising nodes and edges connected between the nodes in a web application environment, in which the hierarchical navigation topology of a web page corresponds to a predetermined topology level and displays one or more applets, comprising:
at least one computer system, including:
a system for defining a user-specific topology based on the navigation topology entered by the user;
a system for storing information for recovering the user-specific topology in a database, wherein the information for recovering the user-specific topology comprises difference information between the navigation topology and the user-specific topology;
system for receiving a user login from the user subsequent to the defining of the user-specific topology and the storing of the difference information between the navigation topology and the user-specific topology;
system for initiating rendering of the navigation topology in response to the user login;
system for stopping the rendering of the navigation topology upon detection of a dynamic node therein;
system for performing a dynamic assembly transformation upon detection of the dynamic node to obtain the user-specific topology, the dynamic assembly transformation comprising:
detecting an identity of the user;
based on the identity of the user, reading the difference information between the navigation topology and the user-specific topology from the database;
generating the user-specific topology by combining the navigation topology and the difference information; and
generating a user specific context topology for the user from the user-specific topology, the user specific context topology representing a modified topology of the user-specific topology that is configured specifically for display on a type of computer system used by the user to perform the computer login; and a system for displaying one of the user-specific topology and the user specific context topology to the user in response to completing the dynamic assembly transformation.

8. The system according to claim 7, wherein the web application comprises a web portal application, and the applets comprise portlets.

9. The system according to claim 7, further comprising: a user interface including an administration applet displayed on a highest level application page.

* * * * *